Aug. 2, 1960

J. R. FORD ET AL 2,947,989

ROTATING RADAR ANTENNA

Filed Nov. 28, 1956

DIRECTION OF WIND

INVENTORS
HAROLD PERKEL
JOHN R. FORD &
IRVING D. KRUGER

BY

ATTORNEY

Aug. 2, 1960 J. R. FORD ET AL 2,947,989
ROTATING RADAR ANTENNA
Filed Nov. 28, 1956 2 Sheets-Sheet 2

INVENTORS
HAROLD PERKEL
JOHN R. FORD &
IRVING D. KRUGER
BY
ATTORNEY

+ # United States Patent Office 2,947,989
Patented Aug. 2, 1960

2,947,989
ROTATING RADAR ANTENNA

John R. Ford, Narberth, Pa., Irving D. Kruger, Haddonfield, N.J., and Harold Perkel, Levittown, Pa., assignors to Radio Corporation of America, a corporation of Delaware Filed Nov. 28, 1956, Ser. No. 624,775

6 Claims. (Cl. 343—757)

This invention relates to large surface antenna structures and other devices which are motor driven in rotation in the presence of wind pressures.

For example, many radar antennas include a large area reflector which may be a piece of solid sheet metal, or a fabricated mesh structure which in itself still has very considerable wind resistance. In order to obtain the desired radiation pattern this reflector is shaped into a predetermined curvature, which results in an aerodynamically unsymmetrical structure. In operation, the reflector, which may be up to one hundred feet in horizontal spread, is placed in a generally vertical plane and rotated about a central vertical axis.

Due to the shape and size of the antenna reflector, rotational driving problems are encountered in strong winds. As the antenna is rotated through one revolution of 360°, the effects of the wind resistive to rotation vary according to the angle of approach of the wind relative to the antenna. This aerodynamic asymmetry in turn presents a correspondingly variable torque load to the motor or other power means driving the antenna in rotation. This condition of varying torque load results in two basic problems: (1) speed regulation of rotation becomes difficult and consequently requires elaborate and complex regulation equipment, and (2) the size of the driving motor must be sufficiently large to overcome the peak values of resistive torque.

An object, then, of our invention is to overcome this fluctuating load condition occasioned by wind effects.

Other objects are:

(1) To provide rotating antenna gear subject to wind pressures which requires only a minimum of associated speed regulation equipment, (2) To lessen the peak torque loads presented to the antenna drive motor, (3) To reduce the over-all (R.M.S.) power or energy necessary to drive the antenna in rotation, and (4) To provide rotating antenna gear subject to wind pressures which requires a smaller drive motor than heretofore possible.

To this end we harness part of the existing wind pressures to provide an over-all assisting torque to offset the above mentioned deleterious effects of the wind.

Accordingly, our invention provides the addition to a conventional rotating antenna of one or more wind cups. These may be hemispherical like those used in anemometers. However, the shape of the cups is a matter of choice as long as they provide differential resistance in two opposite directions. Ordinarily, these wind cups are positioned and oriented so that they assist the drive motor in rotating the antenna through that portion of its revolution in which it encounters greatest resistance from adverse wind effects. However, in some arrangements the wind may be made to provide an overdriving torque upon the antenna at some instant in its revolution. In these arrangements one or more wind cups having reverse orientation are included to provide drag during that portion of the revolution to assist the motor in braking. A plurality of wind cups can be so designed and located as to not only decrease the peak driving requirements presented to the motor, but also to decrease the over-all power—or root mean square value—required from the drive motor.

A representative embodiment of our invention as used with an antenna having a rectangular curved sheet reflector includes a number, say three, of hemispherical wind cups. The cups are fixed to the ends of support rods extending from the antenna structure in a single horizontal plane. The open side of each cup faces back like an anemometer opposite the direction of rotation. Thus, each cup receives a greater force from the wind during one portion of a revolution to aid rotation than it does in the remaining portion of the same revolution to hinder—or provide drag to—rotation. In such an arrangement the wind force received by the cups is translated through the support rods as torque to assist the motor in rotating the antenna. The number of cups, the size of each cup, the angle at which they are mounted on their support rods, and the angular displacement of the support rods in their horizontal plane all depend upon the particular antenna structure in question, the wind speed to be encountered, and the r.p.m. at which the antenna is to be operated. Consideration of these factors and their determination will be hereinafter discussed in reference to Figs. 2 and 3.

Figure 1:
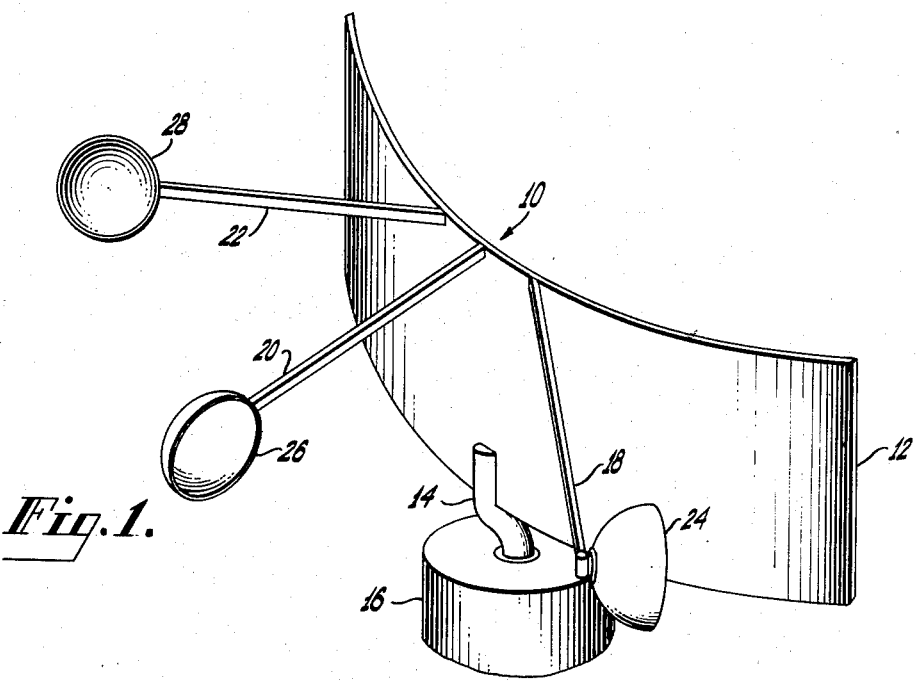
Fig. 1 shows a sketch of an antenna structure incorporating a simplified embodiment of our invention and illustrates the basic structure necessary for the practice of our invention.

Referring to Fig. 1, an antenna structure 10 includes a reflector 12 mounted on, and rotated by, a shaft 14 which extends to within a mounting base 16 where it is geared to a drive motor (not shown). Attached to, and extending from, the back (convex) side of the antenna reflector 12 are three support rods 18, 20, and 22. At the free ends of these rods are affixed three hemispherical wind cups 24, 26, and 28 respectively. The antenna, with the cups positioned as shown, is adapted to rotate continuously in a clockwise direction as viewed from above.

Figure 2:
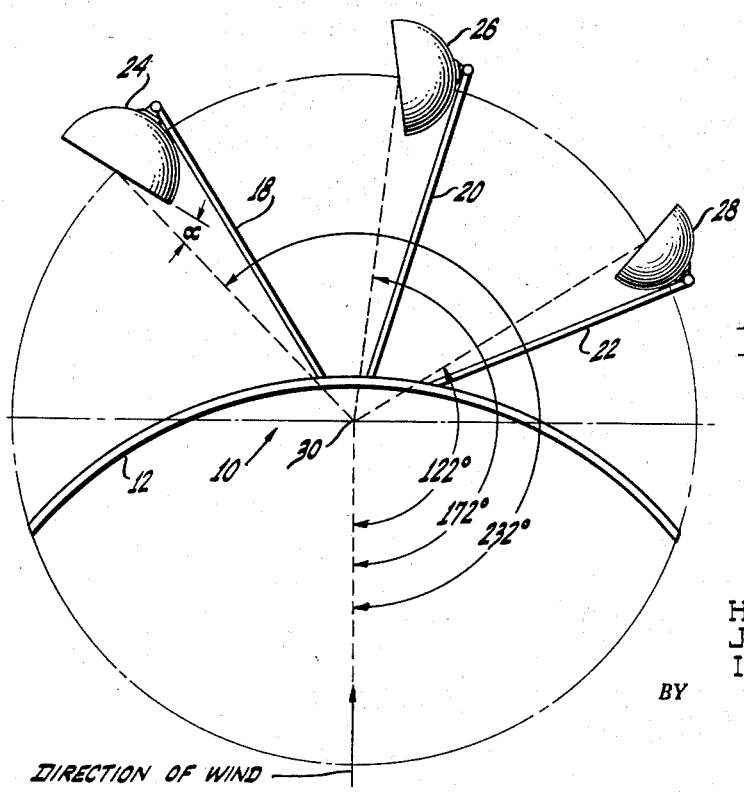
Fig. 2 is a somewhat schematic plan view of the structure shown in Fig. 1 and is useful for the purpose of explaining certain design features.

Referring to Fig. 2, a schematic plan view of the antenna structure 10 of Fig. 1 shows the reflector 12 with support rods 18, 20, and 22 attached thereto. The hemispherical wind cups 24, 26, and 28 are also shown mounted respectively on the free end of the support rods 18, 20, and 22.

Figure 3:
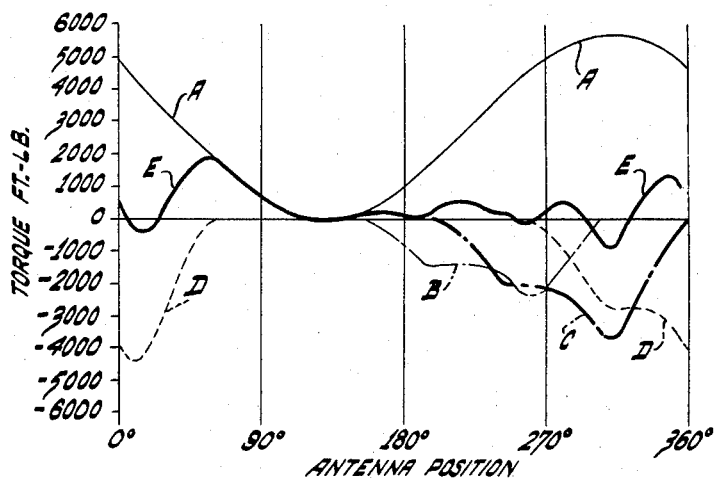
Fig. 3 is a graphical representation of the various torques involved in operation of an antenna of that structure, showing their relation to each other.

Fig. 3 shows one representative family of torque-position curves, and illustrates the relationship of the torques involved in operation of the antenna of Figs. 1 and 2. Angular position in degrees of the antenna structure 10 relative to the direction of the wind is represented along the horizontal axis of abscissas. The position of 0° is that when the antenna reflector 12 is facing directly into the wind as shown in Fig. 2. The data for various angular positions are plotted with the antenna rotating clockwise as viewed from above. Torque in foot-pounds is represented along the vertical axis of ordinates. The torque values of energy put into the system (for example, that supplied by a motor) is shown as positive. This may also be thought of as energy needed to rotate the antenna. The torque values of energy received from the system (for example, that supplied by the wind cups) is shown as negative. This may also be thought of as compensating energy used to assist the drive motor. The specific curves shown in Fig. 3 were generated for a 32 foot antenna rotating at 18 r.p.m. in a 60 m.p.h. wind. Curve "A" represents the drag or resistive torque presented to the drive motor for such an antenna without the addition of wind cups. The points of this curve show the torque which the drive motor must supply at any given instant in order to rotate the antenna. Curve "B" represents the assisting torque provided by a 4 foot wind cup disposed 122° clockwise from the wind direction when the antenna is in its 0° position; curve "C" represents the assisting torque provided by a 5 foot wind cup disposed at 172°; and curve "D" represents the assisting torque provided by a 5½ foot wind cup disposed at 232°. Curve "E" represents the algebraic sum of curves A, B, C, and D. This curve shows the instantaneous torque values required to rotate the antenna with the addition of the three wind cups 24, 26, and 28.

As can be seen from curve A, the drag, or load, presented to the drive motor in the absence of wind cups is a sinusoidal fluctuation varying from 0 to approximately 5500 foot-pounds. This means that without wind cups, the drive motor is at one instant required to supply no driving torque to the antenna while at some later instant in the same revolution of the antenna it must deliver 5500 foot-pounds of driving torque. This condition, as previously stated, results from the fact that at one instant in each antenna revolution the wind is assisting the antenna in rotation while at another instant it is retarding it. Such a condition demands that complex speed regulation equipment be used as well as a drive motor of sufficient size to provide adequate operation during periods of peak load. The ideal solution to this condition would be to compensate for this adverse wind effect so as not only to reduce the peak load requirements of the drive motor, but to also reduce the root mean square requirements. Stated otherwise, not only would the curve A be flattened out, but the area under the curve would be reduced.

To this end it is desirable to provide an amount of compensation such that the flattened version of curve A will approach as nearly as practicable the zero abscissa when the antenna is operated under maximum wind conditions. This will result in operation with minimum power consumption. But it must be kept in mind that a drive motor of sufficient size must be provided to produce the desired operation in still air when no assistance is obtained from the wind cups.

The procedure of our invention used to design such a compensation is one which we have termed "graphic empirical determination of complemental torque wind cup apparatus." Considering the antenna structure of Figs. 1 and 2, the problem then is to determine data regarding number of wind cups, size of wind cups, and angular displacement of cup support rods. This procedure may be set forth as a series of steps as follows:

(1) With a given r.p.m. of rotation, choose a wind velocity value equal to the maximum in which the equipment will have to operate, and design on that basis.

(2) Plot a torque-antenna position curve similar to curve A of Fig. 3 for the values established in step (1) above. Point values for such a curve can be determined by model tests with suitable allowances, by mathematical calculations, or of course by full scale tests in high wind.

(3) Arbitrarily choose the number of wind cups you wish to use. This choice depends upon the practical conflicting considerations of (a) how nearly perfect torque compensation one desires, and (b) how elaborate an embodiment of the invention one is willing to construct. Generally speaking, the more cups used the more nearly perfect the compensation.

(4) Arbitrarily choose a standard size cup for which statistical data is available or can be generated.

(5) Plot to the same scale as the curve of step (2) as many duplicate torque-position curves for the cup of step 4 as you chose cups to use. Point values for this curve may either be determined by experimental tests with suitable allowances or taken from a design handbook treating analogous subject matter. Anemometer design tables will prove helpful here.

(6) Superimpose over the antenna curve of step (2) the cup curves of step (5). Move the cup curves separately relative to the antenna curve along the axis of abscissas, at the same time adjusting the amplitude of one or more of the cup curves until the algebraic sum of the cup curves most nearly approximates the antenna curve but with opposite polarity about the axis of abscissas.

(7) Calculate each cup size using the individual adjusted amplitude cup curves.

(8) The position of the individual cup curves along the axis of abscissas of the antenna curve determines the angular displacement of each cup. Each cup's support rod is disposed so that the center of the cup face is at the determined angular displacement for that cup.

Another factor, which can be included in design and which affects the shape of the torque-position curve of the wind cup, is angle of attack. The angle of attack is that angle $\alpha$ (see Fig. 2) which the plane of the open face of the cup makes with a horizontal line passing through the center of the plane of the open face and the axis of revolution of the antenna. Consultation of anemometer handbook design tables will enable the designer to select this angle so that he is able to best balance out the torque-position curve of the antenna in question.

Figure 4:
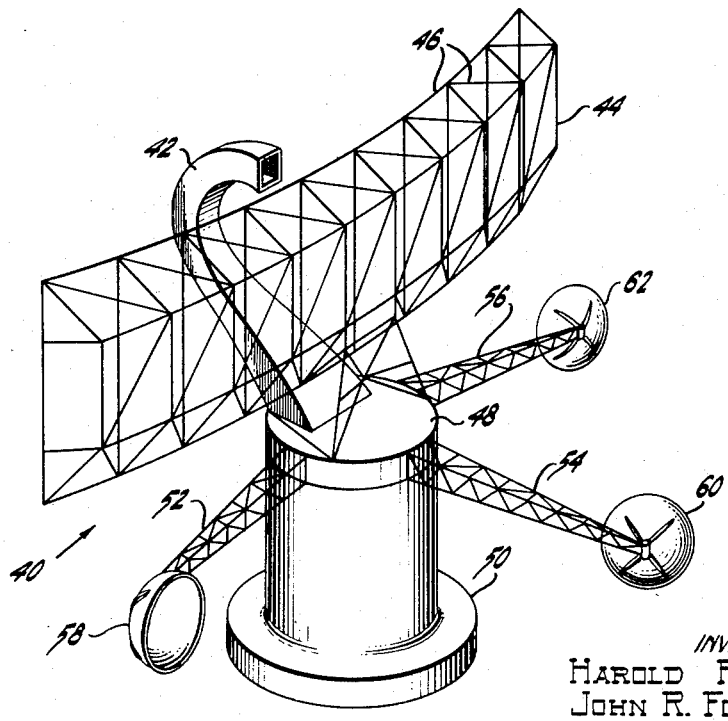
Fig. 4 illustrates an embodiment of our invention likely to be encountered in actual practice according to present day antenna design.

The above procedure may be advantageously used to design apparatus in accordance with our invention for incorporation with conventional present day radar antenna gear. Fig. 4 shows such an installation so designed.

In Fig. 4 an antenna 40 includes a wave guide feed horn 42 so oriented that it directs radio frequency energy toward a reflector 44. The reflector 44 is fabricated in truss-like fashion from conductive metal rod members 46 and has an overall rectangular shape curved so that a concave side faces the feed horn 42. The feed horn and reflector are mounted on a turntable 48 which in turn is mounted upon a fixed pedestal 50. The turntable 48 is geared to a drive motor (not shown) which is housed within the pedestal and which drives the turntable in clockwise rotation. Attached to the periphery of, and radiating from, the turntable are three support arms 52, 54, and 56. These are angularly displaced from each other and carry at their free ends hemispherical wind cups 58, 60, and 62 respectively. The wind cups are so oriented that they serve to assist rotation of the turntable and its associated antenna structure in clockwise rotation.

As can be noted by comparing Fig. 1 with Fig. 4, the support rods need not be attached to the antenna at any particular location so long as they are mounted to revolve with the antenna. The cups may, for example, be supported by rods which are perpendicularly attached to the reflector itself at various elevations, or they may, for example, be supported by an associated rotating structure as suggested in Fig. 4. To a great extent the choice is one determined by available space and structural considerations.

Although we have described our invention as applied to a rotating radar antenna, it will be appreciated that it might also be applied to other large area unsymmetrical devices which may have to be rotated in strong winds.

What we claim is:

1. A composite antenna structure adapted for continuous rotation in the presence of winds, comprising a large area aerodynamically asymmetrical antenna, drive means coupled to said antenna for rotating the same, and at least one wind cup fixed to the antenna, the wind cup being positioned at a predetermined distance from the axis of rotation of the antenna and at a predetermined angular orientation which provides torque to assist the antenna in rotation during that portion of its revolution where wind resistance to its rotation is greatest.

2. In a power driven rotating antenna which has a large surface subject to wind pressures whose effect vary with different angular positions of said surface relative to the direction of the wind, the combination with said large surface of complemental torque apparatus comprising a plurality of wind cups disposed respectively at the ends of support rods fixedly mounted relative to said surface at different horizontal angular positions, said wind cups being so positioned and oriented that they provide power to assist the driving of said antenna in rotation during that portion of its revolution when rotation is being resisted by wind pressures against said large surface.

3. An antenna adapted for rotational operation in the presence of wind comprising the combination of a large surface reflector and graphic empirically determined complemental torque wind cup apparatus, said apparatus including at least one wind cup fixedly disposed relative to said reflector at a distance from the axis of rotation of said antenna and so positioned and oriented that the force exerted by said wind on said cup acts to assist the antenna in rotation during that part of its revolution when said wind is exerting resistive force to rotation on said reflector.

4. Apparatus for reducing the power required to rotate a large aerodynamically unsymmetrical structure exposed to the wind, comprising at least one wind cup mounted on the rotating structure in such position as to give aiding torque when the wind applies maximum retarding torque to the rest of the structure.

5. In combination, a first aerodynamically asymmetrical structure; drive means coupled to said structure for rotating the same about an axis, whereby, in the presence of wind, the driving force required to rotate said structure is greater in one portion of the driving cycle than in another; and passive means fixed to said structure in a position to counteract the effect of the wind on said structure during said one portion of said driving cycle for reducing said driving force required in said one portion of said cycle.

6. In combination, a first aerodynamically asymmetrical structure; drive means coupled to said structure for rotating the same about an axis, whereby, in the presence of wind, the driving force required to rotate said structure is greater in one portion of the driving cycle than in another; and a wind-responsive, second aerodynamically asymmetrical structure fixed to said first structure in a position to counteract the effect of the wind on said first structure during said one portion of said driving cycle, and thereby to reduce said driving force required to rotate said first structure in said one portion of said cycle.

References Cited in the file of this patent
UNITED STATES PATENTS

| | | |
|---|---|---|
| 2,019,403 | Eaton | Oct. 29, 1935 |
| 2,697,828 | Heintz | Dec. 21, 1954 |
| 2,719,921 | Cairnes | Oct. 4, 1955 |
| 2,814,038 | Miller | Nov. 19, 1957 |
| 2,842,767 | Darrouzet | July 8, 1958 |